(No Model.)

B. DREYFUSS.
PASTEBOARD FRAME FOR MIRRORS.

No. 269,270. Patented Dec. 19, 1882.

WITNESSES:
Chas. Nida
Jno. N. Bruno

INVENTOR
Bernard Dreyfuss
BY
ATTORNEY

UNITED STATES PATENT OFFICE.

BERNARD DREYFUSS, OF NEW YORK, N. Y.

PASTEBOARD FRAME FOR MIRRORS.

SPECIFICATION forming part of Letters Patent No. 269,270, dated December 19, 1882.

Application filed October 20, 1882. (No model.)

*To all whom it may concern:*

Be it known that I, BERNARD DREYFUSS, of the city, county, and State of New York, have invented a new and useful Improvement in Pasteboard Frames for Mirrors, &c.; and I do hereby declare that the following is a full, clear, and exact description of the same, reference being had to the accompanying sheet of drawings, making part of this specification.

This invention is in the nature of an improvement in pasteboard frames for mirrors, &c.; and the invention consists in a pasteboard frame formed with a recessed molding to receive the face edge of the glass, and a molding formed in the backing of the frame and surrounding and projecting above the back of the glass as a protecting-guard.

Figure 1:
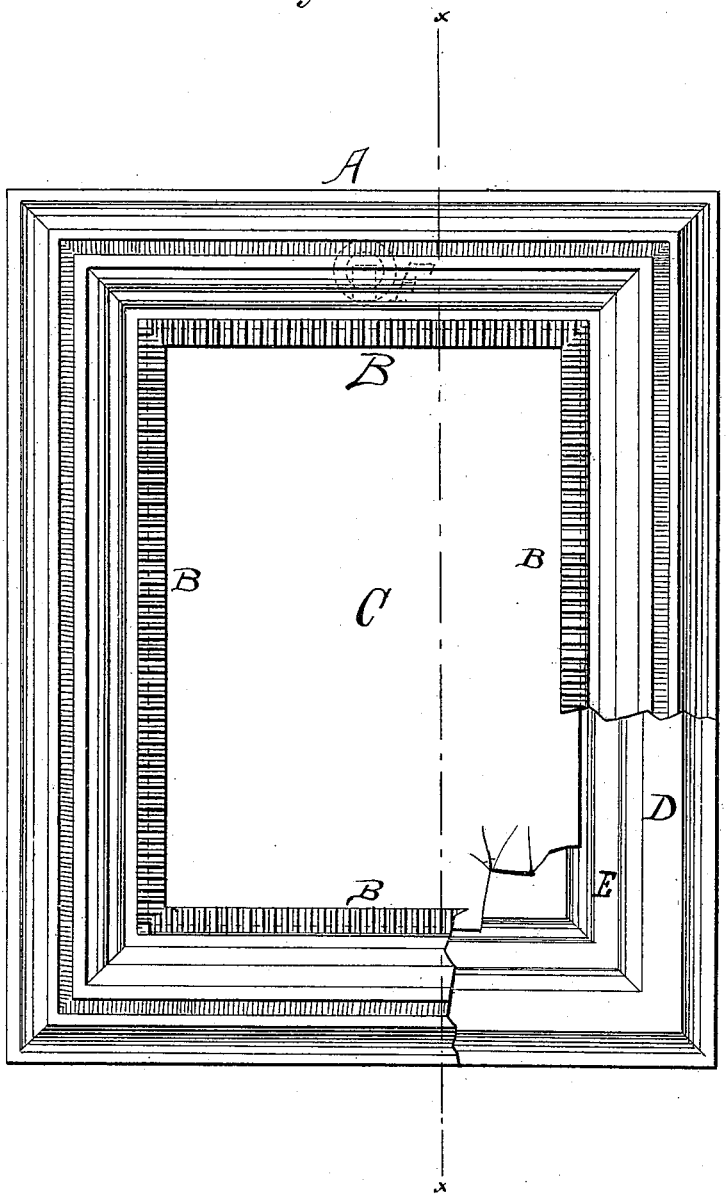
Figure 2:
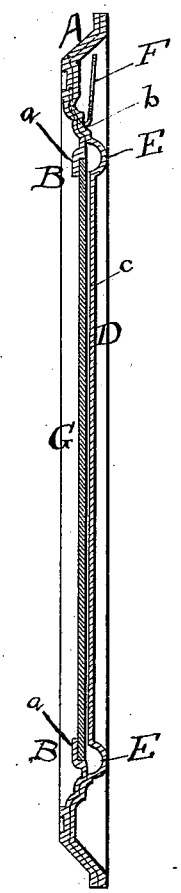

In the accompanying sheet of drawings, Figure 1 is a face view of my frame and glass, partly in section; Fig. 2, a longitudinal section taken in the line $x$ $x$ in Fig. 1.

Similar letters of reference indicate like parts in the several figures.

The purpose of this invention is to produce a frame of pasteboard or papier-maché which shall not only retain the glass firmly in position, but also protect it to some extent from accidental fracture. For that purpose I construct my frame A of pasteboard or other similar substances ornamented with any suitable design or form of molding. Surrounding the opening to receive the glass, in the center of the frame, is formed by a suitable press a molding, B. This molding is recessed at its back, as at $a$, to receive the glass C. The glass, when in position within the molding B, is covered, as is also the entire back of the frame, by a pasteboard backing, D, which has formed in it a molding, E, surrounding and inclosing a portion of the rear edge of the glass, so that the back of the glass, when this backing is in position, is substantially countersunk within the molding E, leaving this molding projecting around the back of the glass, as in Fig. 1, the glass C being placed with the edges of its face within the molding E. The backing D is placed over its back and the back of the frame, and this backing and the under surface of the frame A are glued tightly together, inclosing the glass between them. Now, when the glass is in this way secured to the frame it is not only tightly held in place, but the sides of the frame in the form of moldings or otherwise project above the surface of the glass and preserve it from fracture when the glass is laid on its face, and the molding E of the backing D, projecting above the back of the glass, likewise guards the back of the glass from fracture when it is laid back downward.

At suitable places, either at its top $b$ or at each side $c$ of the backing D, is inserted one or more rings, F, by which the glass may be suspended. These rings are secured to the frame by inserting them through a slit in the backing, and the inserted part of the ring is bent upward, so that when the backing D is glued to the under surface of the frame these rings F will be held or kept tightly in place.

Having now described my invention, what I claim as new, and desire to secure by Letters Patent, is—

As an improved article of manufacture, a frame for mirrors, formed of pasteboard, with a recessed molding, B $a$, to receive the face of the glass, and backing provided with a molding, E, surrounding and projecting above the back of the glass as a protecting-guard, substantially as shown and described.

BERNARD DREYFUSS.

Witnesses:
G. M. PLYMPTON,
JNO. N. BRUNS.